United States Patent

[11] 3,569,635

[72] Inventors Cyril Ettienne Bloch
London;
Victor Teacher, Enfield, England

[21] Appl. No. 674,304
[22] Filed Oct. 10, 1967
[45] Patented Mar. 9, 1971
[73] Assignee International Standard Electric Corporation
[32] Priority Oct. 28, 1966
[33] Great Britain
[31] 48370/66

[54] A TELECOMMUNICATION SYSTEM WITH MEANS FOR DETECTING FAULTS AND REROUTING SIGNALS TO THE FAULT LOCATIONS

11 Claims, 2 Drawing Figs.

[52] U.S. Cl. .......... 179/18, 179/2
[51] Int. Cl. .......... H04q 9/02
[50] Field of Search .......... 179/2R, 18.21, 18 (FW), 16.09

[56] References Cited

UNITED STATES PATENTS 2,224,374 12/1940 Baughman .......... 179/2(R)
3,335,227 8/1967 Jackel .......... 179/2(R)
3,409,877 11/1968 Alterman et al. .......... 179/18(.21)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel, Phillip A. Weiss and Delbert P. Warner

ABSTRACT: A telecommunications system includes a master station which is in communication with any one of a number of outstations via one or the other leg of the two legs of a closed loop cable linking all the outstations along the cable route. A pilot tone is transmitted around the loop (which may be a four-wire telephone circuit) to indicate the occurrence of a fault and simultaneously to initiate switching operations to switch outstations beyond the fault to a healthy leg and isolate the faulty section of the line.

C. E. BLOCH
V. TEACHER
Inventors
By Delbert P. Warner
Attorney

A TELECOMMUNICATION SYSTEM WITH MEANS FOR DETECTING FAULTS AND REROUTING SIGNALS TO THE FAULT LOCATIONS

The present invention relates to a telecommunication system in which a master station is in communication with any one of a number of outstations via one or other of the two legs of a closed loop cable linking all the outstations along the route of a cable.

When such a system is used for high speed transmission of intelligence signals, it is desirable to prevent signals being transmitted to any one outstation simultaneously via both legs of the loop, since the difference between the propagation times in the two legs may give rise to unacceptable distortion of the signals received at the outstation; it is further desirable to provide some reserve capacity in the system against breakdown of one leg of the loop and to bring the other leg into service with minimum delay after the occurrence of a line fault in the first leg.

According to the invention, there is provided a telecommunication system comprising a master station and a plurality of outstations along a cable route, wherein adjacent ones of said outstations along said route are connected by one link of each of a first and a second chain of cable links, each chain having each of its two ends terminated at the master station, wherein the master station comprises means for applying a pilot signal to both said chains in series, wherein each said outstation comprises first and second signal-coupling means coupled to the master station via those of the links of said first and said second chain respectively that are between that outstation and a first one of said two ends, wherein each said signal-coupling means feeds switching means responsive to a failure of said pilot signal in said first chain and the presence of said pilot signal in only said second signal-coupling means, and wherein said switching means responds by switching said first and said second signal-coupling means to those of the links of said first and said second chain respectively, that are between that outstation and the second one of said two ends.

Figure 1:
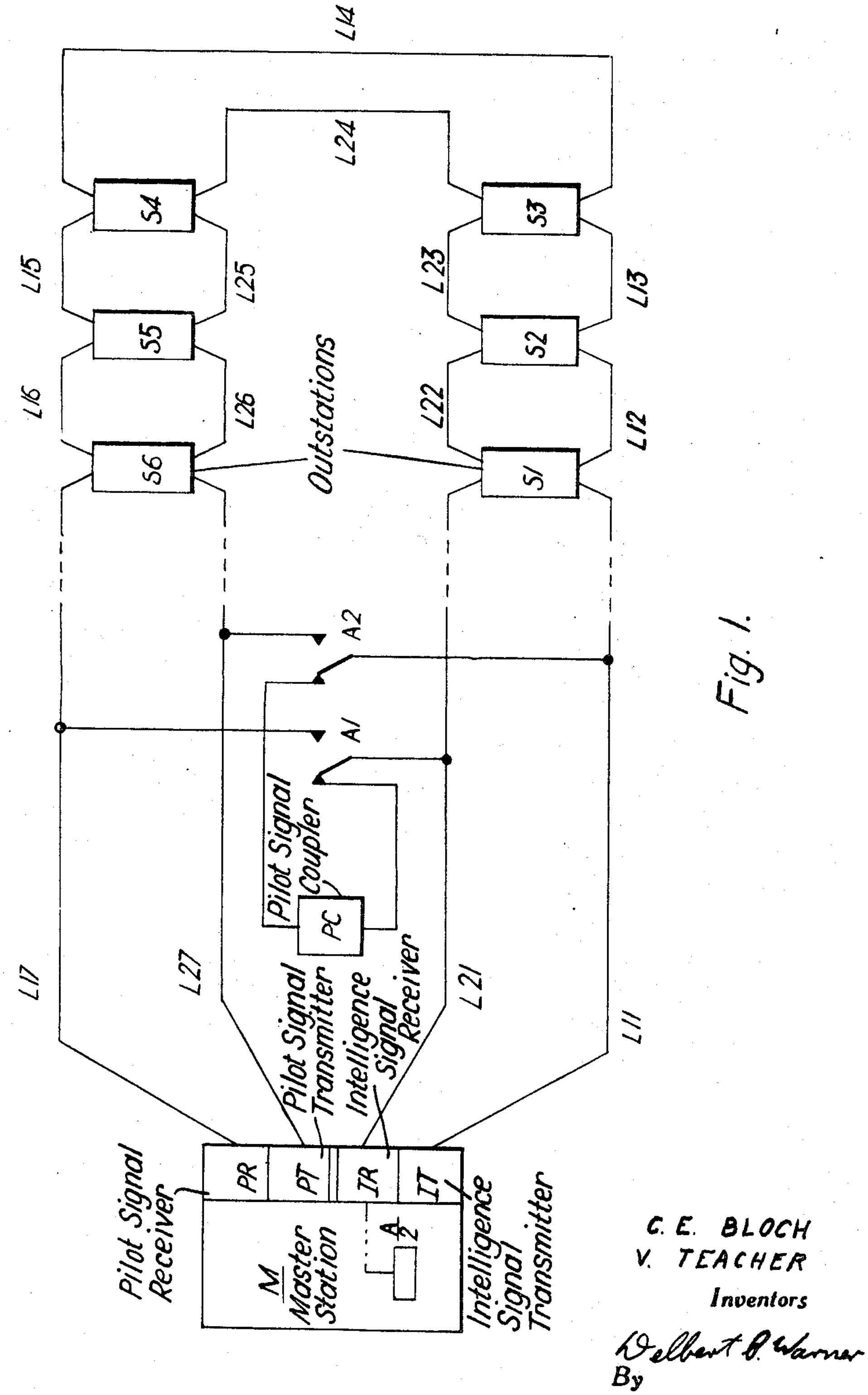
Figure 2:
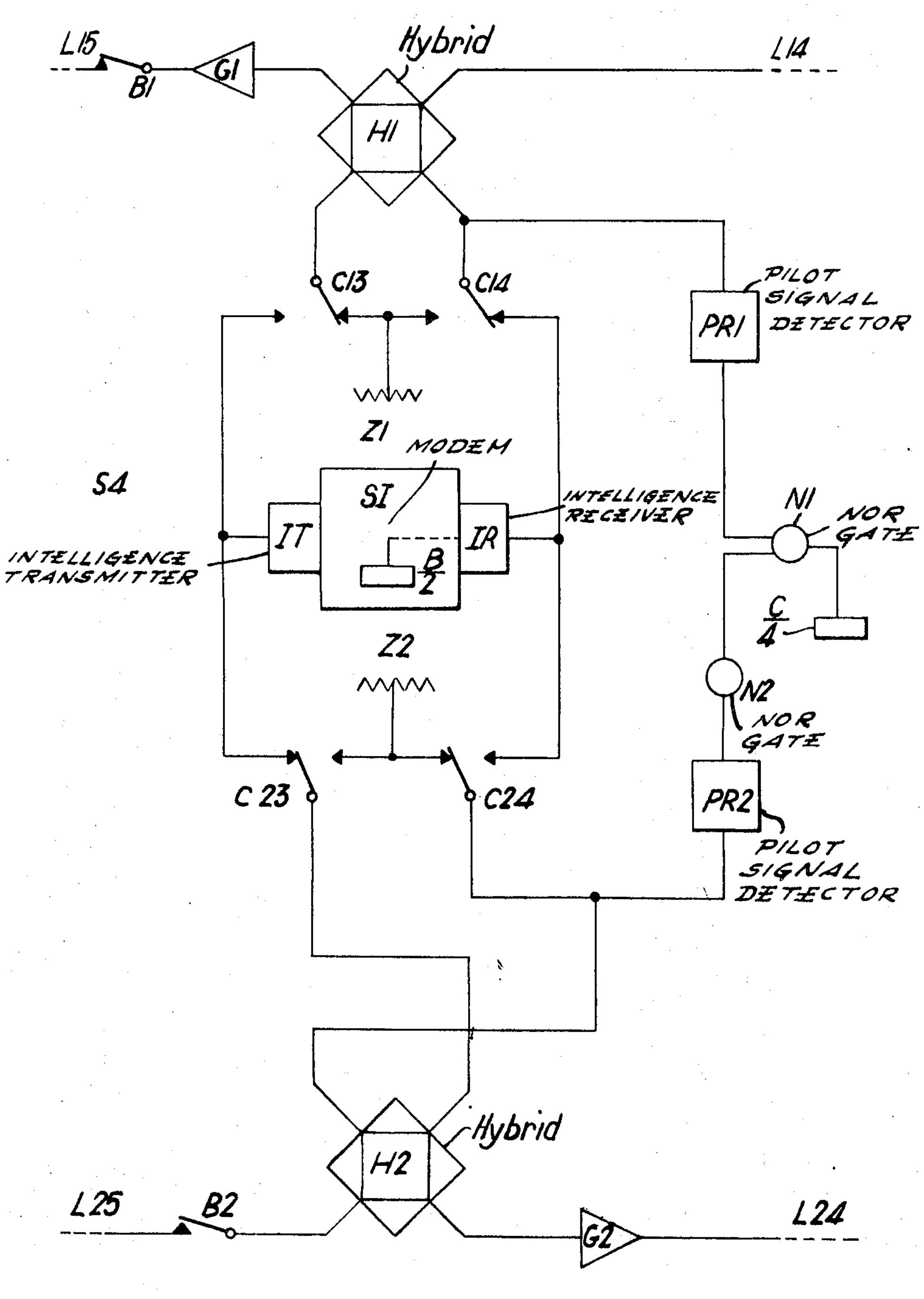

An embodiment of the invention will now be particularly described with reference to the accompanying drawings, in which:

FIG. 1 shows schematically a telecommunications system embodying the invention, and FIG. 2 illustrates in more detail the main circuit elements of one outstation in such a system.

Referring now to FIG. 1 of the drawings, a telecommunications system is shown by way of example to include a master station M and six outstations S1 to S6 linked by a four-wire telephone circuit extending in the form of a closed loop from the master station along a route embracing each of the outstations. The telephone circuit comprises two cable chains of links between stations adjacent along this route. The first chain comprises the links L11 to L17 and the second chain comprises the links L21 to L27. The master station comprises means for applying a pilot signal to both chains in series; these means include a pilot signal transmitter PT, a pilot signal receiver PR and pilot signal coupling means PC. The first ends of the first and second of the two chains, are connected to an intelligence signal transmitter IT and an intelligence signal receiver IR, respectively, at the master station; the second ends of the first and second chains, i.e. links L17 and L27 respectively, are connected to the pilot signal receiver PR and the pilot signal transmitter PT. The master station further comprises a relay A, energizable by the receiver IR and resettable manually, controlling contact sets A1 and A2 shown schematically only. In the normal, nonenergized condition of the relay, these contacts connect the pilot signal coupling means across the links L11 and L21, so that a pilot tone circuit extends via both chains in series, i.e. from transmitter PT via Links L27, L26, L25, L24, L23, L22 and L21 to the coupling means PC and thence via Links L11 to L17 to the receiver PR. When a line interruption is sensed at the master station either directly by the pilot signal receiver PR or, as in the preferred embodiment illustrated in FIG. 1, indirectly by the intelligence signal receiver IR, relay A is energized and contacts A1 and A2 disconnect Links L11 and L21 from the pilot signal coupling means PC, thus disabling it, and connect these links to links L27 and L17, respectively, so that after a line fault, the direction of transmission along each the two chains is reversed for those links between the second ends of the chains and the links suffering from a fault. Each of these links may be either part of a two-wire circuit or consist of a single line and an earth return.

In the preferred embodiment the pilot signal is an alternating current signal at a frequency of 420 cycles per second, i.e. the frequency of the supervisory channel of 600/1200 baud modems which conform to the standards of the C.C.I.T.T. (Comite Consultatif International Telephonique et Telegraphique). This frequency is outside the range of the frequencies of the intelligence signal and the pilot signal-coupling means may therefore be a band-pass filter, which is sharply tuned to the pilot signal frequency and does not shunt intelligence signals from transmitter IT directly to the receiver IR; in the preferred embodiment, the transmitter IT and receiver IR include filters which offer a high degree of rejection at this frequency.

Referring now to FIG. 2 of the drawings, outstation S4, by way of example, is shown in more detail together with the terminating links connecting it to adjacent stations S3 and S5, i.e. Links L14 and L15 respectively in the first chain and links L24 and L25 respectively in the second chain. The outstation comprises a modem SI, which includes an intelligence transmitter IT and an intelligence receiver IR, as well as a relay B. Signals are coupled between the modem and the first and second chains by four port hybrids H1 and H2 respectively, shown conventionally as squares in which coupling is provided between ports shown at any adjacent sides of the square and in which substantial isolation is provided between ports shown at any mutually opposite sides of the square.

In other words, if the ports were to be numbered consecutively round the periphery of the square, each odd-numbered port would be coupled to both even-numbered ports and substantially isolated from the respective other odd-numbered port, which each even-numbered port would be coupled to both odd-numbered ports and substantially isolated from the respective other even-numbered port. The first of these four ports of the hybrids H1 and H2 is connected to signal receiving links L14 and L25 respectively and the second is connected to signal transmitting links L15 and L24 respectively. The transmitting links L15 and L24 may include, if necessary or desirable repeater-amplifiers G1 and G2, respectively, to compensate for hybrid or cable link losses and to provide mismatch isolation under fault conditions. The links extending from the outstation S4 towards the second end of each of the two chains, i.e. Links L15 and L25, include normally closed contact sets B1 and B2 of the relay B. The third parts of the hybrids H1 and H2 alternatively connectable under control of contact sets C13 and C23 respectively of a relay C to the intelligence transmitter IT. The fourth ports of the hybrids H1 and H2 are alternatively connectable under control of contact sets C14 and C24 respectively of the relay C to the intelligence receiver IR. The aforementioned contact sets of the relay C also provide that whichever one of the third and fourth ports which is not connected to the modem is alternatively connected to the respective one of hybrid terminating impedance Z1 and Z2. Under normal conditions, the contact sets of relay C provide connections as shown in FIG. 2, so that outstation S4 receives signals from the master station via Link L14 of the first chain and transmits signals to the master station via Link L24 of the second chain. Energization of the relay C changes over contact sets C13, C14, C23 and C24 so that outstation S4 then receives signals from the master station via Link L25 of the second chain and transmits signals to the master station via Link L15 of the first chain, so that the outstation now communicates with the master station via the second end of the chain instead of the first as it would under normal conditions.

The energization of relay C is controlled by pilot signal-detecting means PR1 and PR2 coupled to the fourth ports of hybrids H1 and H2 respectively. The output of pilot signal receiver PR1 is applied to one of two inputs of a NOR gate N1 and the output of pilot signal receiver PR2 is applied via a NOR gate N2 to a second input of the NOR gate N1 which when its output is "true" drives relay C. Thus relay C is energized only when outstation S4 is in itself operative and when neither input to the NOR gate N1 is in the "true" condition, which in turn requires that the output from either the pilot signal receiver PR1 or the NOR gate N2 is "false." Consequently relay C is energized only in the condition in which there is simultaneous presence of the pilot signal on the second chain, i.e. link L25, and absence of the pilot signal in the first chain, i.e. link L14. This failure of the pilot signal in the first chain may be due to a failure in any of the links L24, L23, L22, L21, L11, L12, L13 or L14, since that is the sequence of the links in the path of the pilot signal emanating from the pilot signal transmitter PT (shown in FIG. 1) of the master station. Energization of relay C is thus indicative of a failure in those of the links of either of the two chains which are between outstation S4 and the first end of the two chains. When such a cable link failure occurs and relay C causes the outstation transmitter IT and receiver IR to be interchanged at the coupling hybrids H1 and H2, it becomes desirable to introduce a deliberate interruption in both of the two corresponding cable links to ensure that no outstation can be in communication with the master station via two separate paths of possibly different propagation times, i.e. via both ends of the remaining wholly operative chain. In a telecommunication system which does not include remote control facilities at the master station, this may be achieved by further switching means (not shown) under control of relay C. This further switching means includes normally closed contacts which would break the links L14 and L24 on energization of relay C. Further contacts (not shown) of relay C may then be used to send a special signal or a modified pilot signal to outstations S5 and S6 to prevent the operation of their respective further switching means as a result of the energization of the relays C of these two stations. The same special signal or modified pilot signal may be used further to act upon the pilot signal receiver PR (FIG. 1) of the master station to cause operation of relay A (FIG. 1), which may alternatively be operated by the failure of the pilot signal at that pilot signal receiver in consequence of a failure of any one of the cable links.

In the preferred embodiment, however, the master station does include remote control facilities and the aforementioned deliberate interruption is effected by the transmission of a command signal to the outstation next to the first end side of the cable link failure, i.e. to outstation S4 in the event of a failure in either link L15 and L25. This command signal, when received by the intelligence signal receiver IR of the outstation, causes relay B to be energized and the consequent opening of relay contact sets B1 and B2 interrupts the cable links L15 and L25.

To illustrate the operation of the system, let it be assumed that a line fault has occurred in either one or both links between outstations S3 and S4, i.e. links L14 and L24. Such a line fault results in the following sequence of events.

i. At outstation S4, S5 and S6, the absence of the pilot signal on the line links of the first chain in the continued presence of the pilot signal on the line links of the second chain causes the energization of the relay C at each one of these stations and, at the same time, the loss of pilot signal in receiver PR at the master station gives an indication that a line fault has occurred and requires attention. The switching over of the transmitters and receivers at the outstations S4, S5 and S6 makes them "look" towards the second ends of the chains for communication with the master station.

ii. The onset of a line fault indication causes the master station to switch to a scanning mode operation under the control of logical circuit devices including a program storage device. In this scanning mode, the master station addresses each outstation in turn, by transmitting a signal to which the outstation is uniquely responsive, starting with S1 and continuing with higher numbered outstations on receipt of a single acknowledgement from each outstation so addressed. In the chosen example of a fault between outstations S3 and S4, this sequential interrogation proceeds until it is the turn of outstation S4 to be addressed. No acknowledgement can be received from this outstation by the master station. According to the program, the interrogation may be repeated one or more times to avoid erroneous fault location due to interference. The absence of the acknowledgement from outstation S4 in indicative of a line fault between the outstations S3 and S4.

iii. The program now switches off the scanning mode and the master station addresses outstation S3 and sends a command signal to operate relay B at that outstation. This ensures that whatever the nature of the fault on the affected link, a deliberate open circuit condition is introduced on both pairs.

iv. Outstation S3 transmits back to the master station an intelligence signal confirming the operation of relay B.

v. On receipt of this confirmatory signal, the master station operates relay A, thereby providing communication with outstations S4, S5 and S6, i.e. an outward path from the master station via links L25 to L27 and a return path to the master station via links L15 to L17.

vi. The scanning mode is then resumed with a further addressing of outstation S4, which should now respond with the predetermined acknowledgement.

vii. On completion of the scanning, the system reverts to its normal routine function.

It will be readily apparent, that the foregoing sequence may be made entirely automatic and need therefore involve loss of the operational facilities of the system for only a few seconds. The pilot signal continues to be absent from at least the last link of the first chain, i.e. link 17, so that an indication of the line fault condition remains until the fault is rectified and the system is restored to its normal mode of operation when the fault has been cleared, the restoration of the system includes the following sequence of events:

viii. An operator presses and maintains depressed a "reset" key or pushbutton.

ix. Depression of this key deenergizes relay A, thereby reinserting the pilot signal coupling means PC and restoring the full pilot signal circuit at the first end of the two chains up to the point deliberately interrupted by contacts B1 and B2 of outstation S3.

x. Continued depression of the key after the release of relay A causes the master station to address outstation S3 with a command signal to release relay B.

xi. The release of relay B is confirmed at the master station by the reappearance of the pilot signal at the receiver PR. At the same time, reappearance of the pilot signal on all of the first chain links causes the release of an energized relay C at any outstation.

xii. The reappearance of output from the pilot signal receiver PR at the master station cancels the line fault indication.

xiii. The operator may now release the key and the logic circuit devices, having sensed another interruption in normal transmission, under the control of the program storage device switch the master station once more to the scanning mode to interrogate the outstations sequentially starting at outstation S1.

xiv. On receipt of a satisfactory acknowledgement from the last outstation, the master station reverts once more to its normal routine function.

It is to be understood that the foregoing description of specific examples of this invention is made by way of example only and is not to be considered as a limitation on its scope.

We claim:

1. A telecommunication system comprising a master station, a plurality of outstations, a cable route including first and second chains of cable links for connecting the outstations together, first and second ends of the chains of said cable route each terminating at the master station as part of a closed loop, each outstation incorporating first and second coupling means connected between adjacent links of the cable route to complete the closed loop, the master station including means for applying a pilot signal to a first cable link at the second ends of the chains of said cable route and over that cable link and the first coupling means of an outstation to first coupling means of successive outstations, means connecting said first ends of the chains of said cable route to intelligence signal-transmitting and receiving means respectively of the master station, means connecting said first ends of said first and second chains of said cable route to pilot signal-receiving and transmitting means of the master station, pilot signal-coupling means connectable between said intelligence signal-transmitting and receiving means in such a manner that when each said chain is operative said pilot signal is transmitted from said master station via said second chain to said pilot signal-coupling means and thence via said first chain back to said master station.

2. A telecommunications system as claimed in claim 1, wherein said master station comprises resettable switching means, said means being reset in response to loss of the pilot signal indicating signals to certain outstations have been cut off by a fault, said switching means providing a connection between the first end of the first chain and the second end of the second chain and a further connection between the first end of the second chain and the second end of the first chain to enable transmission of intelligence signals to the outstations cut off by the fault.

3. A telecommunication system as claimed in claim 2, comprising further switching means at each outstation which is caused to operate by the response of the switching means at one said outstation and which, when operated, causes an interruption in both of the cable links between said one outstation and the next adjacent outstation along said route in the direction towards said second ends to prevent possible reception of signals over two paths having different propagation times.

4. A telecommunication system as claimed in claim 3, wherein said master station monitors the condition of said further switching means so as to set said resettable switching means only after the operation of said further switching means.

5. A telecommunications system as claimed in claim 2, wherein said resettable switching means, when set, disables said pilot signal-coupling means.

6. A telecommunications system as claimed in claim 1, wherein said pilot signal is an alternating current signal of a frequency not included in the frequency range of said intelligence signals, and wherein said pilot signal coupling means is a band-pass filter.

7. A telecommunications system as claimed in claim 3, wherein each outstation includes intelligence signal-transmitting and receiving means connected under control of said further switching means, and wherein operation of said further switching means in response to said failure causes the outstation intelligence signal transmitting and receiving means to be connected to said first and said second signal coupling means respectively.

8. A telecommunications system as claimed in claim 7, wherein each said signal-coupling means comprises a hybrid device having four ports, wherein the first one of said four ports is connected to the link over which the outstation in normal operation of the system receives intelligence signals, the second one of said four ports is connected to the link over which the outstation in normal operation of the system transmits intelligence signals, the third one of said four ports is connected by said further switching means to the intelligence signal-transmitting means of said outstation, and the fourth one of said four ports is connected by said further switching means to the intelligence signal-receiving means of said outstation, the arrangement of the hybrid device being such that each odd-numbered port is coupled to both even-numbered ports and substantially isolated from the respective other odd-numbered port, and that each even-numbered port is coupled to both odd-numbered ports and substantially isolated from the respective other even-numbered port.

9. A telecommunications system as claimed in claim 9, wherein said fourth port of the hybrid device of each of said two signal-coupling means is individually coupled to pilot signal-detecting means coupled via logic circuit means to said switching means.

10. A telecommunications system as claimed in claim 9, wherein said logic circuit means comprises a first and a second NOR gate, wherein the pilot signal-detecting means associated with said first chain is coupled via a first one of two inputs of the first NOR gate to said switching means, and wherein the pilot signal detecting means associated with said second chain is coupled via the second NOR gate to the second one of said two inputs.

11. A telecommunications system as claimed in claim 1, in which the master station comprises a program storage device controlling via logic circuit devices means for addressing outstations individually by coded address intelligence signals, means for interrogating outstations to cause them to transmit stored information to the master station and means for operating the receiving means of an addressed outstation to cause a predetermined control function to be effected.